(12) United States Patent
Lee et al.

(10) Patent No.: US 9,519,186 B2
(45) Date of Patent: Dec. 13, 2016

(54) DISPLAY DEVICE INCLUDING A COLOR CONVERSION LAYER

(71) Applicant: Samsung Display Co., Ltd., Yongin, Gyeonggi-Do (KR)

(72) Inventors: Kwangkeun Lee, Osan-si (KR); Dong-Uk Kim, Hwaseong-si (KR); Youngmin Kim, Yongin-si (KR); Min Ki Nam, Anseong-si (KR); Haeil Park, Seoul (KR); Seon-Tae Yoon, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/522,850

(22) Filed: Oct. 24, 2014

(65) Prior Publication Data

US 2015/0286097 A1 Oct. 8, 2015

(30) Foreign Application Priority Data

Apr. 3, 2014 (KR) ........................ 10-2014-0040056

(51) Int. Cl.
*G02F 1/1333* (2006.01)
*G02F 1/1335* (2006.01)

(52) U.S. Cl.
CPC ... *G02F 1/133617* (2013.01); *G02F 1/133512* (2013.01); *G02F 1/133514* (2013.01)

(58) Field of Classification Search
CPC ............ G02F 1/133514; G02F 1/13516; G02F 1/133621; G02F 1/133512; G02F 1/136222
See application file for complete search history.

(56) References Cited

U.S. PATENT DOCUMENTS 7,580,023 B2 8/2009 Pugh et al.
7,656,476 B2 2/2010 So
(Continued)

FOREIGN PATENT DOCUMENTS

KR 1020130084872 A 7/2013
KR 10-1362151 B1 2/2014
WO WO 2013137052 A1 * 9/2013 ........... G02B 5/0242

OTHER PUBLICATIONS

Heo et al., "Color PH-LCD Using STN Mode", IDW, 1998, pp. 221-224.
(Continued)

*Primary Examiner* — Mariceli Santiago
(74) *Attorney, Agent, or Firm* — Cantor Colburn LLP

(57) ABSTRACT

A display device includes a display panel including pixels arranged in a matrix form along first and second directions crossing each other, a backlight unit configured to generate and provide a first light to the display panel, and a color conversion layer. Each pixel includes first and sub-pixels spaced apart from each other. The color conversion layer includes a first sub-color conversion layer overlapping the first sub-pixel and configured to receive the first light and to emit the second light having a wavelength different from that of the first light, and a second sub-color conversion layer overlapping the second sub-pixel, spaced apart from the first sub-color conversion layer and configured to receive the first light and to emit the first light. In a plan view, areas of the first and second sub-color conversion layers are different from each other.

17 Claims, 7 Drawing Sheets

(56) References Cited

U.S. PATENT DOCUMENTS

| | | | |
|---|---|---|---|
| 7,876,304 B2 | 1/2011 | Lee | |
| 2004/0125278 A1* | 7/2004 | Park | G02F 1/133514 349/106 |
| 2005/0052590 A1* | 3/2005 | Ochiai | G02B 6/0068 349/71 |
| 2008/0055515 A1 | 3/2008 | Ha et al. | |
| 2010/0001939 A1* | 1/2010 | Ochiai | G02F 1/133512 345/88 |
| 2010/0141568 A1 | 6/2010 | Lee et al. | |
| 2010/0265692 A1 | 10/2010 | Willemsen et al. | |
| 2012/0008075 A1 | 1/2012 | Kwon et al. | |
| 2013/0027616 A1* | 1/2013 | Takata | G02F 1/133514 348/725 |
| 2013/0222746 A1* | 8/2013 | Itoh | G02B 5/201 349/106 |
| 2013/0329169 A1* | 12/2013 | Kim | G02F 1/133528 349/96 |
| 2015/0042933 A1* | 2/2015 | Ueki | G02B 5/0242 349/108 |

OTHER PUBLICATIONS

Njo et al., "23.3: Light-Efficient Liquid Crystal Displays Using Photoluminescent Color Filters", SID Digest, 2000, pp. 343-345.
Oh et al., "Highly efficient full-color display based on blue LED backlight and electrochromic light-valve coupled with front-emitting phosphors", Optics Express, vol. 19, No. 17, Aug. 15, 2011, pp. 16022-16031.

\* cited by examiner

DISPLAY DEVICE INCLUDING A COLOR CONVERSION LAYER

This application claims priority to Korean Patent Application No. 10-2014-0040056, filed on Apr. 3, 2014, and all the benefits accruing therefrom under 35 U.S.C. §119, the contents of which are hereby incorporated by reference in its entirety.

BACKGROUND

1. Field

The invention relates to a display device. More particularly, the invention relates to a display device including a color conversion layer.

2. Description of the Related Art

Various thin panel display devices, such as a liquid crystal display device, an electrowetting display device, an electrophoretic display device, etc., are widely used. The thin panel display device includes a light-receiving type display panel and a backlight unit configured to supply light to the display panel. In general, the backlight unit supplies a white light to the display panel and the white light is converted to a light having a specific color by passing through a color filter disposed in the display panel, and thus a user perceives the light having the color.

SUMMARY

Research into a display device including a color conversion layer instead of the color filter continues to increase. The display device including the color conversion layer includes a display panel in which one pixel is designed to include sub-pixels respectively representing colors such as red, green and blue colors, and the color conversion layer including sub-color conversion layers respectively displaying colors such as the red, green and blue colors to display an image. In the display device including the color conversion layer, a light leakage and a color mixture occur in the display device, and a display quality of the display device is deteriorated.

One or more exemplary embodiment of the invention provides a display device capable of reducing or effectively preventing a light leakage and a color mixture.

Exemplary embodiments of the invention provide a display device including a display panel, a backlight unit and a color conversion layer. The display panel includes a plurality of pixels arranged in a matrix form along a first direction, and a second direction crossing the first direction. The backlight unit is configured to generate and provide a first light to the display panel. The color conversion layer includes a first sub-color conversion layer and a second sub-color conversion layer.

Each pixel includes a first sub-pixel, and a second sub-pixel spaced apart from the first sub-pixel.

The first sub-color conversion layer is overlapped with the first sub-pixel and is configured to receive the first light and to emit the second light. The second sub-color conversion layer is overlapped with the second sub-pixel, is spaced apart from the first sub-color conversion layer, and is configured to receive the first light and to emit the first light. The first sub-color conversion layer has an area different from an area of the second sub-color conversion layer in a plan view.

Each of the color conversion layer, the first sub-color conversion layer and the second sub-color conversion layer may have a quadrangular shape.

In the plan view, a first side of the first sub-color conversion layer and a first side of the second sub-color conversion layer may be collinear. In addition, a second side of the first sub-color conversion layer, which is substantially parallel to the first side of the first sub-color conversion layer, and a second side of the second sub-color conversion layer, which is substantially parallel to the first side of the second sub-color conversion layer, may be collinear.

The color conversion layer may further include a black matrix, and the black matrix may surround the first and second sub-color conversion layers in the plan view.

Each of the pixels may further include a display area in which an image is displayed and a non-display area in which no image is displayed.

The first and second sub-color conversion layers may be overlapped with the display area and the black matrix may be overlapped with the non-display area.

The black matrix may include a first black matrix portion between the first sub-color conversion layer and the second sub-color conversion layer, a second black matrix portion spaced apart from the first black matrix portion and contacting the first sub-color conversion layer, and a third black matrix portion spaced apart from the first black matrix portion and contacting the second sub-color conversion layer.

When widths in the first direction of the first black matrix portion, the second black matrix portion and the third black matrix portion are respectively referred to as first, second and third widths, the first width may be greater than each of the second and third widths.

The first width may be equal to a sum of the second width and the third width.

When a width in the first direction of the first sub-color conversion layer is referred to as a first sub-width and a width in the first direction of the second sub-color conversion layer is referred to as a second sub-width, the first sub-width may be greater than the second sub-width.

The first light may be a blue light.

The second light may be a red light or a green light.

The plurality of pixels may include a first pixel including the first sub-pixel and the second sub-pixel, and a second pixel including a third sub-pixel, and a fourth sub-pixel spaced apart from the third sub-pixel. The display device may include a plurality of color conversion layers including a first color conversion layer and a second color conversion layer. The first color conversion layer may include the first sub-color conversion layer and the second sub-color conversion layer. The second color conversion layer may include a third sub-color conversion layer and a fourth sub-color conversion layer. The third sub-color conversion layer may overlap the third sub-pixel and be configured to receive the first light and emit a third light having a wavelength different from the first and second lights. The fourth sub-color conversion layer may overlap the fourth sub-pixel, may be spaced apart from the third sub-color conversion layer and may be configured to receive the first light and to emit the first light.

The third sub-color conversion layer may have an area different from an area of the fourth sub-color conversion layer in the plan view.

The area of the first sub-color conversion layer may be equal to the area of the third sub-color conversion layer in the plan view.

Each of the first and second color conversion layers may be provided in a plural number, and the first color conversion layer and the second color conversion layer may be alternately arranged with each other in the first and second directions.

The display panel may include a first display substrate, a second display substrate facing the first display substrate, and a liquid crystal layer disposed between the first display substrate and the second display substrate.

The display panel may include a first display substrate. The first display substrate may include a first base substrate, an electrode part including a first electrode and a second electrode on the first base substrate, insulated from each other and configured to form an electric field therebetween, an insulating layer on the electrode part and defining a tunnel-shaped cavity between the first and second electrodes, and a protecting layer covering the insulating layer and sealing the tunnel-shape cavity.

The color conversion layer may be above or below the display panel.

According to one or more exemplary embodiment of a display device according to the invention, since a light color-converting sub-pixel is integrated as a single, discrete (one) sub-pixel and the width of the black matrix between the integrated single, discrete (one) sub-pixel and a light color-transmitting sub-pixel is increased without decreasing respective widths of the integrated single, discrete (one) sub-pixel and the light color-transmitting sub-pixel, the light leakage and color mixture may be reduced or effectively prevented from occurring in the display device.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
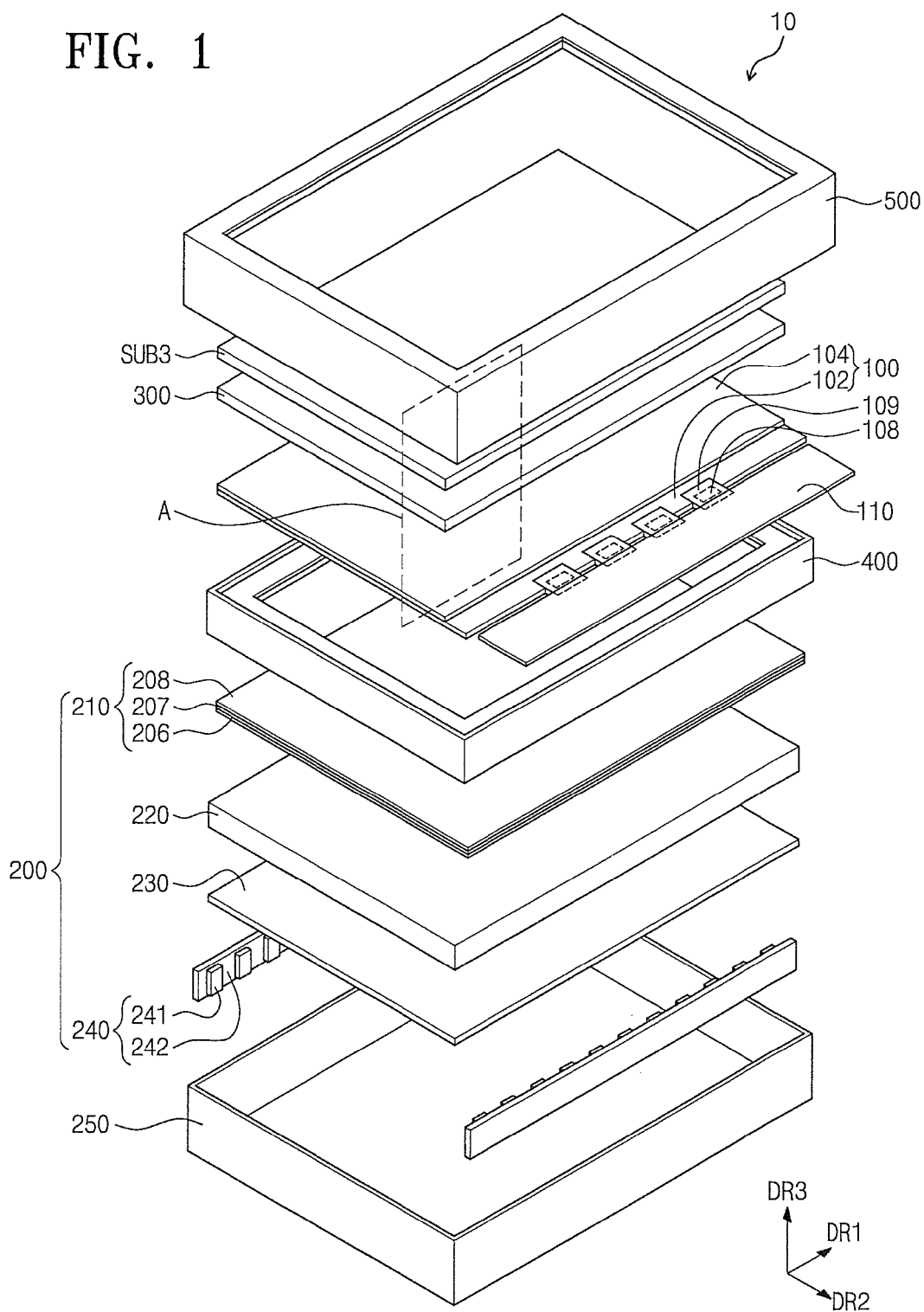
FIG. 1 is an exploded perspective view showing an exemplary embodiment of a display device according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2:
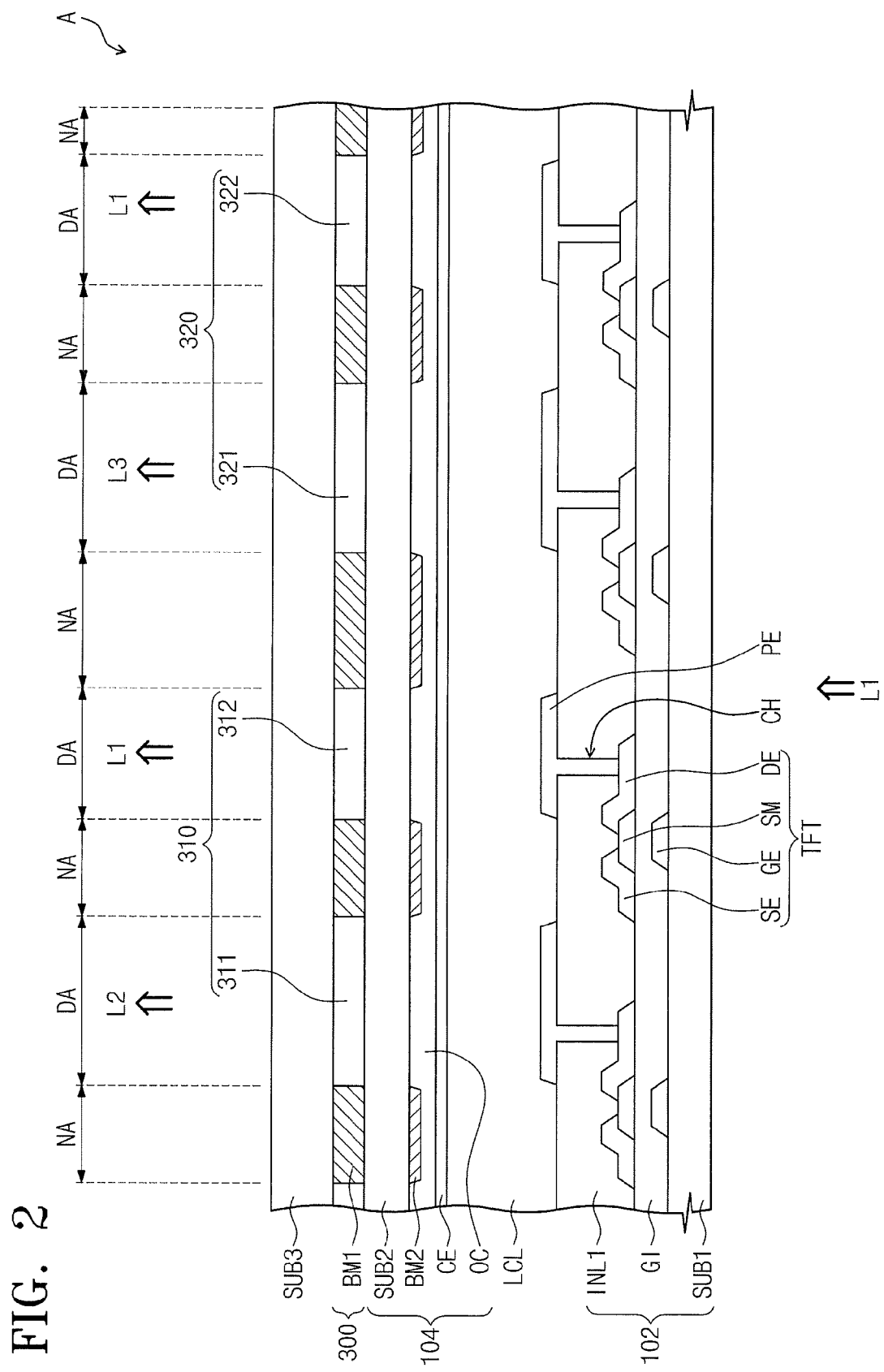
FIG. 2 is a cross-sectional view showing portion "A" in FIG. 1.

FIG. 1 is an exploded perspective view showing an exemplary embodiment of a display device 10 according to the invention and FIG. 2 is a cross-sectional view showing portion "A" in FIG. 1.

Referring to FIGS. 1 and 2, the display device 10 includes a display panel 100, a backlight unit 200, a color conversion layer member 300, a mold frame 400, a bottom chassis 250 and a top chassis 500. The display panel 100 includes a first display substrate otherwise referred to as a first substrate 102 and a second display substrate otherwise referred to as a second substrate 104.

Hereinafter, a long side direction of the display device 10 is referred to as a first direction DR1 and a short side direction of the display device 10 is referred to as a second direction DR2 substantially perpendicular to the first direction DR1. The bottom chassis 250, the backlight unit 200, the mold frame 400, the display panel 100, the color conversion layer member 300 and the top chassis 500 are sequentially stacked one on another in a third direction DR3 substantially vertical to the first and second directions DR1 and DR2. Although not shown in figures, the color conversion layer member 300 may be disposed under the display panel 100.

As the display panel 100, a non-self emissive display panel for which the backlight unit 200 is used rather than a self-emissive display panel such as an organic light emitting display panel. In exemplary embodiments, for instance, various display panels, e.g., a liquid crystal display panel, an electrophoretic display panel, etc., may be used as the display panel 100. In the illustrated exemplary embodiment, the liquid crystal display panel will be described as a representative example.

The display panel 100 includes a plurality of pixels PXL (refer to FIG. 3), each including at least one thin film transistor TFT and a pixel electrode PE to drive liquid crystal molecules of a liquid crystal layer LCL.

Figure 3:
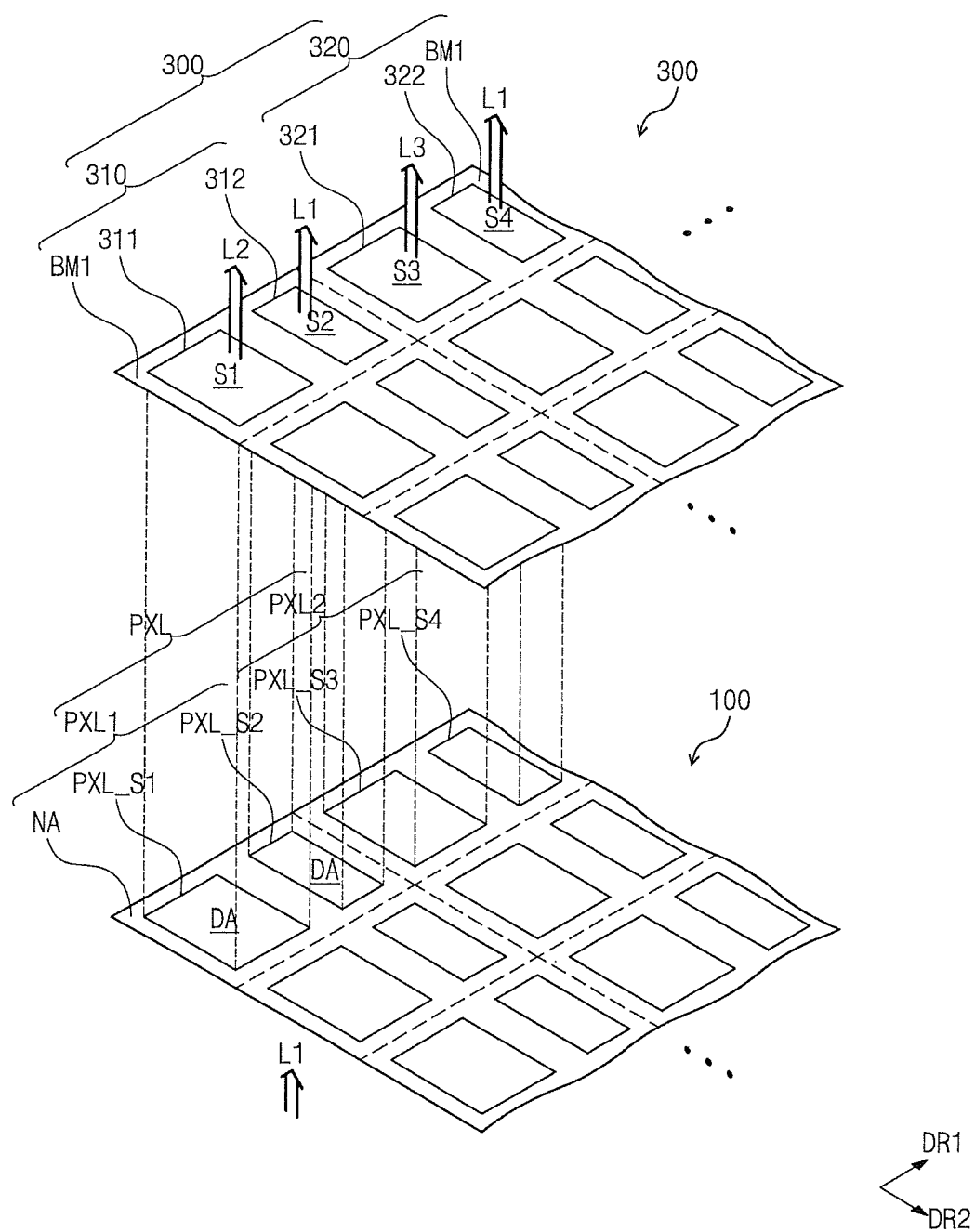
FIG. 3 is a perspective view showing an exemplary embodiment of a display panel and a color conversion layer of a display device according to the invention.

FIG. 3 is a perspective view showing an exemplary embodiment of the display panel 100 and the color conversion layer member 300 of the display device 10 according to the invention.

The pixels PXL may be defined by gate lines (not shown) and data lines (not shown), but the invention is not limited thereto or thereby. Referring to FIG. 3, each of the pixels PXL collectively includes a first pixel portion otherwise referred to as a first pixel PXL1 and a second pixel portion otherwise referred to as a second pixel PXL2. The pixels PXL are disposed to correspond to the color conversion layer member 300, and the display panel 100 including the pixels PXL has a pentile structure. Each of the pixels PXL includes a display area DA in which an image is displayed and a non-display area NA in which no image is displayed.

The first and second pixels PXL1 and PXL2 are arranged in a matrix form and alternately arranged in the first and second directions DR1 and DR2.

When viewed in the third direction DR3, e.g., a thickness direction of the display panel 100, an end or edge of the first pixel PXL1 makes contact with an end or edge of the second pixel PXL2 in a (top) plan view, but the invention is not limited thereto or thereby. That is, ends or edges of the first pixel PXL1 and the second pixel PXL2 may be spaced apart from each other.

Each of the first and second pixels PXL1 and PXL2 has a quadrangular shape in the plan view, but the shape of the first and second pixels PXL1 and PXL2 should not be limited to the quadrangular shape. In an exemplary embodiment, for instance, the first and second pixels PXL1 and PXL2 may have various shapes, e.g., a circular shape, an oval shape, a triangular shape, etc.

The first pixel PXL1 has an area substantially the same as an area of the second pixel PXL2 when viewed in the third direction DR3 of the display panel 100, that is, in the plan view.

The first pixel PXL1 includes a first sub-pixel PXL_S1 and a second sub-pixel PXL_S2. The first sub-pixel PXL_S1 and the second sub-pixel PXL_S2 are spaced apart from each other.

The first and second sub-pixels PXL_S1 and PXL_S2 correspond to the display area DA and have different areas from each other when viewed in the third direction DR3 of the display panel 100, that is, in the plan view.

The second pixel PXL2 includes a third sub-pixel PXL_S3 and a fourth sub-pixel PXL_S4. The third sub-pixel PXL_S3 and the fourth sub-pixel PXL_S4 are spaced apart from each other.

The third and fourth sub-pixels PXL_S3 and PXL_S4 correspond to the display area DA and have different areas from each other when viewed in the third direction DR3 of the display panel 100, that is, in the plan view.

The area of the first sub-pixel PXL_S1 may be equal to the area of the third sub-pixel PXL_S3, but the invention is not limited thereto or thereby. That is, the area of the first sub-pixel PXL_S1 may be different from the area of the third sub-pixel PXL_S3 in the plan view.

The area of the second sub-pixel PXL_S2 may be equal to the area of the fourth sub-pixel PXL_S4, but the invention is not limited thereto or thereby. That is, the area of the second sub-pixel PXL_S2 may be different from the area of the fourth sub-pixel PXL_S4 in the plan view.

Referring to FIGS. 1 and 3 again, the first substrate 102 includes a first base substrate SUB1, the thin film transistor TFT and the pixel electrode PE.

The first base substrate SUB1 may be a transparent insulating substrate, e.g., a plastic substrate, a glass substrate, a quartz substrate, etc.

The gate lines and the data lines are disposed on the first base substrate SUB1. The gate lines extend in a first direction D1 on the first base substrate SUB1. The data lines extend in a second direction D2 substantially perpendicular to the first direction D1 to cross the gate lines such that a gate insulating layer GI is disposed between the gate lines and the data lines.

For the convenience of explanation, hereinafter, one or two gate lines and one or two data lines will be referred to explain the pixel area PXL since the pixel areas PXL have the same structure and function.

The thin film transistor TFT includes a gate electrode GE, a semiconductor pattern SM, a source electrode SE and a drain electrode DE.

The gate electrode GE is branched from the gate line or provided at a portion of the gate line. The gate electrode GE includes a metal material. The gate electrode GE may have a multi-layer structure. The gate electrode GE includes nickel, chromium, molybdenum, aluminum, titanium, copper, tungsten or alloys thereof.

The gate insulating layer GI is disposed on the gate electrode GE. The gate insulating layer GI is disposed over an entire surface of the first base substrate SUB1 to cover the gate line and the gate electrode GE.

The semiconductor pattern SM is disposed on the gate insulating layer GI. The semiconductor pattern SM is disposed on the gate electrode GE while the gate insulating layer GI is disposed between the gate electrode GE and the semiconductor pattern SM, and thus a portion of the semiconductor pattern SM is overlapped with the gate electrode GE.

The source electrode SE is branched from the data line DL. A portion of the source electrode SE is overlapped with the gate electrode GE.

The drain electrode DE is spaced apart from the source electrode SE while the semiconductor pattern SM is disposed between the drain electrode DE and the source electrode SE in the plan view. A portion of the drain electrode DE is overlapped with the gate electrode GE. A portion of the semiconductor pattern SM is exposed by the spaced apart drain and source electrodes DE and SE.

The source electrode SE and the drain electrode DE may have a multi-layer structure. The source electrode SE and the drain electrode DE include nickel, chromium, molybdenum, aluminum, titanium, copper, tungsten or alloys thereof.

The pixel electrode PE is disposed on a first insulating layer INL1. The first insulating layer INL1 may have a multi-layer structure, e.g., a double-layer structure of an organic layer and/or an inorganic layer.

The pixel electrode PE is connected to the drain electrode DE via a contact hole CH. The pixel electrode PE includes a transparent conductive material. The pixel electrode PE includes a transparent conductive oxide, e.g., indium tin oxide ("ITO"), indium zinc oxide ("IZO"), indium tin zinc oxide ("ITZO"), etc. In an exemplary embodiment of manufacturing a display device, the pixel electrode PE may be formed through various methods, e.g., a photolithography process.

The second substrate 104 includes a second base substrate SUB2, a black matrix BM2 (hereinafter, referred to as a second-substrate black matrix) for the second base substrate SUB2, and a common electrode CE. According to another exemplary embodiment, although not shown in figures, the second-substrate black matrix BM2 and the common electrode CE may be included in the first substrate 102.

The second base substrate SUB2 may be a transparent insulating substrate, e.g., a plastic substrate, a glass substrate, a quartz substrate, etc.

The second-substrate black matrix BM2 is disposed on the second base substrate SUB2 to correspond to a light blocking area of the first substrate 102. The light blocking area corresponds to an area in which the data line DL, the thin film transistor TFT and the gate line are disposed. The pixel electrode PE is not disposed in the light blocking area, and thus the liquid crystal molecules are not aligned, thereby causing a light leakage. Thus, the second-substrate black matrix BM2 is disposed in the light blocking area to reduce or effectively prevent the light leakage from occurring. In an exemplary embodiment of manufacturing a display device, the second-substrate black matrix BM2 may be formed by forming a light blocking material layer configured to absorb a light and patterning the light blocking material layer through a photolithography process, however, the invention is not limited thereto or thereby. In another exemplary embodiment of manufacturing a display device, for instance, the second-substrate black matrix BM2 may be formed by an inkjet method.

A planarization layer OC is disposed on the second-substrate black matrix BM2. The planarization layer OC planarizes an upper surface of the second substrate 104 including the second-substrate black matrix BM2 is disposed.

The common electrode CE is disposed on the planarization layer OC. The common electrode CE includes a transparent conductive material. The common electrode CE includes a conductive metal oxide, such as ITO, IZO, ITZO, etc. In an exemplary embodiment of manufacturing a display device, the common electrode CE is formed through various methods, e.g., a photolithography process.

The liquid crystal layer LCL includes the liquid crystal molecules having a refractive index anisotropy. The liquid crystal molecules in the liquid crystal layer LCL are rotated in a specific direction between the first substrate 102 and the second substrate 104 when the electric field is formed between the pixel electrode PE and the common electrode CE, and thus a transmittance of the light passing through the liquid crystal layer LCL is controlled.

The color conversion layer member 300 receives a first light L1 from the backlight unit 200 and outputs at least one of the first light L1, and a second light L2 having a wavelength different from that of the first light L1.

The color conversion layer member 300 is disposed on (e.g., above) or under the display panel 100, with respect to the third direction DR3.

The color conversion layer member 300 collectively includes a plurality of color conversion layers such as a first color conversion layer 310 and a second color conversion layer 320. The first color conversion layer 310 includes a first sub-color conversion layer 311 and a second sub-color conversion layer 312, and the second color conversion layer 320 includes a third sub-color conversion layer 321 and a fourth sub-color conversion layer 322. These will be described in more detail later.

The color conversion layer member 300 includes light emitting particles (not shown) and metal particles (not shown), but the invention is not limited thereto or thereby. That is, one color conversion layer such as the second color conversion layer 320 may be a transparent layer or include only metal particles.

The light emitting particles may be a fluorescent substance or a quantum dot, and the metal particles may include at least one selected from gold, silver, aluminum, platinum, palladium, cadmium, cobalt, ruthenium, copper, indium, nickel, iron and alloys thereof.

The display device 10 further includes a third base substrate SUB3, but the third base substrate SUB3 may be omitted according to alternative exemplary embodiments. The third base substrate SUB3 is disposed on the color conversion layer member 300.

The third base substrate SUB3 may be a transparent insulating substrate, e.g., a plastic substrate, a glass substrate, a quartz substrate, etc.

Referring again to FIG. 1, a driving chip 108 is disposed at a side of the first substrate 102 to apply a data signal to the data lines. The driving chip 108 generates the data signal applied to the data lines of the display panel 100 in response to an external signal. The external signal is provided from a printed circuit board 110 and includes an image signal, various control signals and/or a driving voltage.

A gate driving circuit (not shown) is disposed at another side of the first substrate 102 (e.g., opposite to the side at which the driving chip 108 is disposed) such as through a thin film process to apply a gate signal to the gate lines. Accordingly, the gate driving circuit may be disposed within the display panel 100.

The driving chip 108 applies the driving signal to the display panel 100 and the printed circuit board 110 is electrically connected to the display panel 100.

The driving chip 108 may be provided in plurality and include two or more driving chips, e.g., a data driving chip, a gate driving chip, etc., and is mounted on the first substrate 102 such as in a chip-on-glass ("COG") manner.

The printed circuit board 110 is electrically connected to the display panel 100 through a plurality of tape carrier packages 109, and the driving chips 108 are mounted on the tape carrier packages 109. The tape carrier packages 109 are bent to cover a side surface of the bottom chassis 250.

Where the tape carrier packages 109 are bent to cover a side surface of the bottom chassis 250 the printed circuit board 110 connected to the tape carrier packages 109 is disposed under the bottom chassis 250. The display device 10 may further include a shield case (not shown) disposed under the bottom chassis 250 to protect the printed circuit board 110 disposed under the bottom chassis 250.

The backlight unit 200 generates and provides the first light L1 to the display panel 100. The first light L1 has a visible wavelength, e.g., a blue light.

The backlight unit 200 includes a light source unit 240 and a light guide plate 220. The light source unit 240 generates and provides the first light L1 to the light guide plate 220. The light source unit 240 includes at least one light source 241 configured to generate and emit the first light L1, and a circuit board 242 configured to apply a source voltage to the light source 241. The light source 241 is mounted on the circuit board 242.

The light guide plate 220 guides the first light L1 provided from the light source unit 240. The circuit board 242 has a plate shape. The light source unit 240 includes a plurality of light emitting diodes as a light source 241. The light emitting diodes are disposed on the circuit board 242 and arranged in the first direction DR1 at regular intervals.

The backlight unit 200 further includes an optical member 210 disposed between the light guide plate 220 and the display panel 100, and a reflective sheet 230 disposed under the light guide plate 220.

The optical member 210 includes a first optical sheet 206, a second optical sheet 207 and a third optical sheet 208, which are sequentially stacked one on another, to improve brightness and viewing angle of the light exiting from the light guide plate 220.

The first optical sheet 206 serves as a diffusion sheet and is configured to diffuse the light exiting from the light guide plate 210. The second optical sheet 207 serves as a prism sheet and is configured to condense the diffused light by the diffusion sheet in a vertical direction to the plane surface of the display panel 100. The third optical sheet 208 serves as a protective sheet and is configured to protect the second optical sheet 207 from external impacts. At least one of the first, second and third optical sheets 206, 207 and 208 may be provided in a plural number, and in another exemplary embodiment, one of the first, second and third optical sheets 206, 207 and 208 may be omitted.

The reflective sheet 230 reflects light leaked downward from the light guide plate 220 such that the leaked light is re-incident to the light guide plate 220. The reflective sheet 230 includes a material configured to reflect the light.

The mold frame 400 is interposed between the display panel 100 and the backlight unit 200 and is configured to support the display panel 100.

The bottom chassis 250 accommodates the backlight unit 200.

The top chassis 500 faces the bottom chassis 250 and is coupled to the bottom chassis 250 to cover an edge of the display panel 100 in the plan view.

Figure 4:
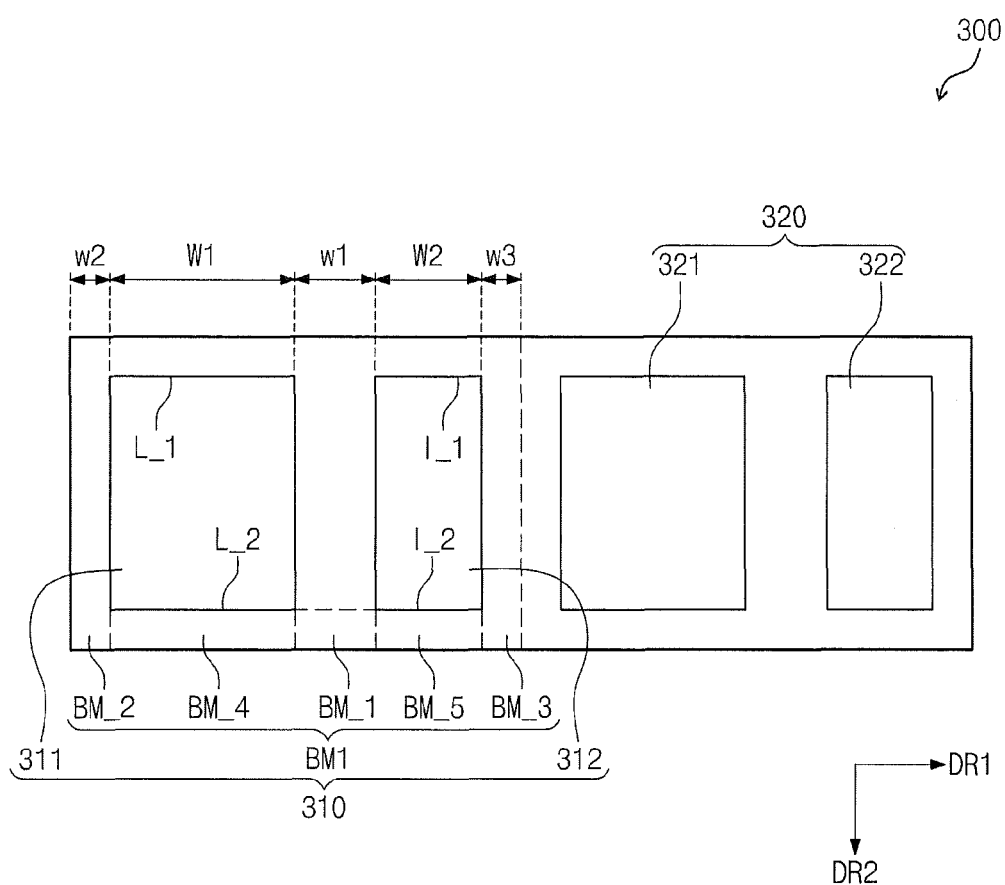
FIG. 4 is a plan view showing an exemplary embodiment of a color conversion layer of a display device according to the invention.

FIG. 4 is a plan view showing an exemplary embodiment of a color conversion layer of a display device according to the invention.

Referring to FIGS. 1 to 4, the display panel 100 includes the pixels PXL. The pixels PXL are arranged in a matrix form along the first and second directions DR1 and DR2, which are substantially perpendicular to each other.

Referring to FIGS. 3 and 4, the color conversion layer member 300 includes the first color conversion layer 310 and the second color conversion layer 320. The first color conversion layer 310 includes the first sub-color conversion layer 311 and the second sub-color conversion layer 312, and the second color conversion layer 320 includes the third sub-color conversion layer 321 and the fourth sub-color conversion layer 322.

The first color conversion layer 310 and the second color conversion layer 320 are alternately arranged with each other in the first and second directions DR1 and DR2. When viewed in the third direction DR3, e.g., the thickness direction of the display panel 100, an end or edge of the first color conversion layer 310 makes contact with an end or edge of the second color conversion layer 320, but the invention is not limited thereto or thereby. That is, the first color conversion layer 310 and the second color conversion layer 320 may be spaced apart from each other in the plan view.

Each of the first and second color conversion layers 310 and 320 has a quadrangular shape, but the shape of the first and second color conversion layers 310 and 320 should not be limited to the quadrangular shape. In an exemplary embodiment, for instance, the first and second color conversion layers 310 and 320 may have various shapes, e.g., a circular shape, an oval shape, a triangular shape, etc.

The first color conversion layer 310 has an area substantially the same as an area of the second color conversion layer 320 when viewed in the third direction DR3 of the display panel 100, that is, in the plan view.

The first color conversion layer 310 includes the first sub-color conversion layer 311 and the second sub-color conversion layer 312. The first sub-color conversion layer 311 and the second sub-color conversion layer 312 are spaced apart from each other.

Each of the first and second sub-color conversion layers 311 and 312 has a quadrangular shape, but the shape of the first and second sub-color conversion layers 311 and 312 should not be limited to the quadrangular shape. In an exemplary embodiment, for instance, the first and second sub-color conversion layers 311 and 312 may have various shapes, e.g., a circular shape, an oval shape, a triangular shape, etc.

The first sub-color conversion layer 311 is overlapped with the first sub-pixel PXL_S1. The first sub-color conversion layer 311 receives the first light L1 and emits the second light L2 different from the first light L1. In an exemplary embodiment, for instance, the first sub-color conversion layer 311 receives the blue light and emits a red light.

The second sub-color conversion layer 312 is overlapped with the second sub-pixel PXL_S2. The second sub-color conversion layer 312 receives the first light L1 and emits the first light L1. In an exemplary embodiment, for instance, the second sub-color conversion layer 312 receives the blue light and emits the blue light.

The first sub-color conversion layer 311 has an area S1 different from an area S2 of the second sub-color conversion layer 312 when viewed in the third direction DR3 of the display panel 100. In an exemplary embodiment, for instance, when the first sub-color conversion layer 311 emits the red light and the second sub-color conversion layer 312 emits the blue light, the blue light may be emitted from the second color conversion layer 320 adjacent to the first color conversion layer 310. Therefore, the red light may be emitted through the larger area than that of the blue light in the first color conversion layer 310.

When viewed in the third direction DR3 of the display panel 10, a first side L_1 of the first sub-color conversion layer 311 and a first side l_1 of the second sub-color conversion layer 312 are positioned at the same extending line, that is, collinear with each other. In addition, a second side L_2 of the first sub-color conversion layer 311, which is substantially parallel to the first side L_1 of the first sub-color conversion layer 311, and a second side I_2 of the second sub-color conversion layer 312, which is substantially parallel to the first side I_1 of the second sub-color conversion layer 312, are positioned at the same extending line that is, collinear with each other.

When a width in the first direction DR1 of the first sub-color conversion layer 311 and a width in the first direction DR2 of the second sub-color conversion layer 312 are respectively referred to as first and second sub-width W1 and W2, the first sub-width W1 is greater than the second sub-width W2.

The color conversion layer member 300 further includes a black matrix BM1. The black matrix BM1 surrounds the first and second sub-color conversion layers 311 and 312 when viewed in the third direction DR3 of the display panel 100. The black matrix BM1 includes the same material as that of the second-substrate black matrix BM2.

As described above, each pixel PXL includes the display area DA in which the image is displayed and the non-display area NA in which no image is displayed.

The first and second sub-color conversion layers 311 and 312 are overlapped with the display area DA, and the black matrix BM1 is overlapped with the non-display area NA.

The black matrix BM1 includes a first black matrix portion BM_1, a second black matrix portion BM_2 and a third black matrix portion BM_3.

The first black matrix portion BM_1 is disposed between the first sub-color conversion layer 311 and the second sub-color conversion layer 312. The second black matrix portion BM_2 is spaced apart from the first black matrix portion BM_1 and makes contact with the first sub-color conversion layer 311. The third black matrix portion BM_3 is spaced apart from the first black matrix portion BM_1 and makes contact with the second sub-color conversion layer 312. The black matrix portions may form a boundary or define edges of the first and second pixels PXL1 and PXL2, but the invention is not limited thereto.

The black matrix BM1 further includes a fourth black matrix portion BM_4 and a fifth black matrix portion BM_5. The first and second black matrix portions BM_1 and BM_2 are connected to each other by the fourth black matrix portion BM_4, and the first and third black matrix portions BM_1 and BM_3 are connected to each other by the fifth black matrix portion BM_5.

When a width in the first direction DR1 of the first black matrix portion BM_1, a width in the first direction DR1 of the second black matrix portion BM_2, and a width in the first direction DR1 of the third black matrix portion BM_3 are respectively referred to as first, second and third widths w1, w2 and w3, the first width w1 is greater than each of the second width w2 and the third width w3. That is, the first width w1 is greater than the second width w2 and greater than the third width w3. The second width w2 is substantially the same as the third width w3, but the invention is not limited thereto or thereby. That is, the second width w2 may be different from the third width w3.

In general, a conventional display device displays an image using a display panel including pixels each having red, green and blue sub-pixels, and a color conversion layer including red, green and blue sub-color conversion layers respectively corresponding to the red, green and blue sub-pixels. In the conventional display device, a light leakage and a color mixture occur in the display panel, and thus a display quality of the display panel is deteriorated. To prevent the light leakage and the color mixture from occurring, a conventional structure that increases the width of the black matrix has been suggested, but an aperture ratio of the pixels is reduced when the width of the black matrix is increased. As a result, the display quality of the conventional display device is deteriorated and the viewing angle is insufficient.

However, according to one or more exemplary embodiment of the display device 10 of the invention, the red sub-pixel and the green sub-pixels are integrated as a single, discrete (one) sub-pixel and the width of the black matrix between an integrated single, discrete (one) sub-pixel and the blue sub-pixel is increased without decreasing respective widths of the integrated single, discrete (one) sub-pixel and the blue sub-pixel. As a result, the light leakage and the color mixture may be reduced or effectively prevented from occurring without reducing the aperture ratio.

The first width w1 may be equal to or greater than a sum of the second width w2 and the third width w3.

In an exemplary embodiment, for instance, the first width w1 may be 1.1 times to three times the second width w2. When the first width w1 is less than 1.1 times the second width w2, the reduction in the light leakage and the color mixture is insufficient, and when the first width w1 exceeds three times the second width w2, the light leakage and the color mixture are reduced, but the display quality is deteriorated and the viewing angle is insufficient since the aperture ratio is reduced.

The second color conversion layer 320 includes the third sub-color conversion layer 321 and the fourth sub-color conversion layer 322. The third sub-color conversion layer 321 is spaced apart from the fourth sub-color conversion layer 322. A structure of the third and fourth sub-color conversion layers 321 and 322 respectively corresponds to that of the first and second sub-color conversion layers 311 and 312, and thus the following descriptions will be focused on different features of the third and fourth sub-color conversion layers 321 and 322 from the first and second sub-color conversion layers 311 and 312.

The third sub-color conversion layer 321 is overlapped with the third sub-pixel PXL_S3. The third sub-color conversion layer 321 receives the first light L1 and emits the third light L3 different from the first light L1. In an exemplary embodiment, for instance, the third sub-color conversion layer 321 receives the blue light and emits the green light.

The fourth sub-color conversion layer 322 is overlapped with the fourth sub-pixel PXL_S4. The fourth sub-color conversion layer 322 receives the first light L1 and emits the first light L1. In an exemplary embodiment, for instance, the fourth sub-color conversion layer 322 receives the blue light and emits the blue light.

The third sub-color conversion layer 321 has an area S3 different from an area S4 of the fourth sub-color conversion layer 322 when viewed in the third direction DR3 of the display panel 100.

Hereinafter, another exemplary embodiment of a display device 20 according to the invention will be described.

Figure 5:
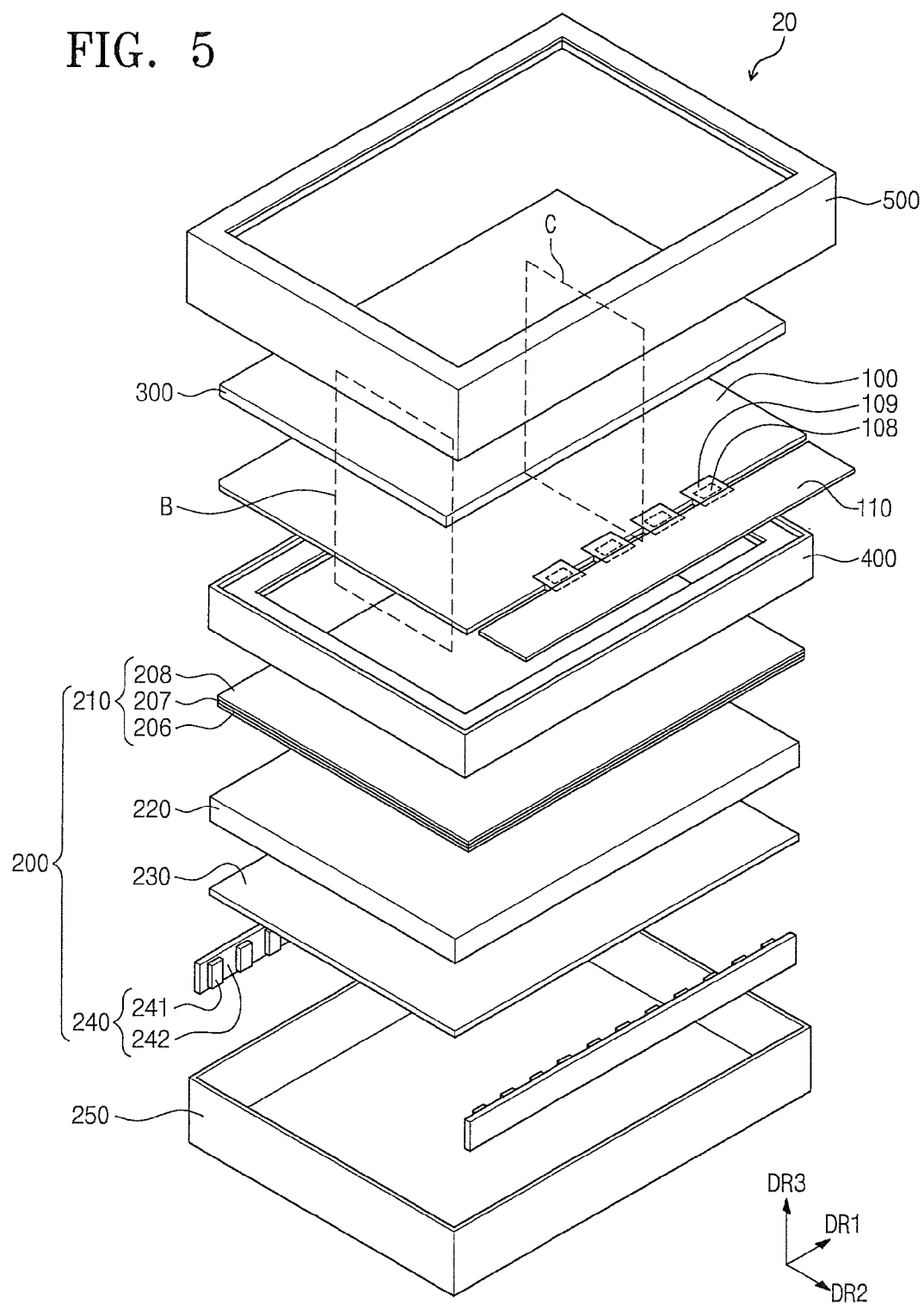
FIG. 5 is an exploded perspective view showing another exemplary embodiment of a display device according to the invention.
Figure 6:
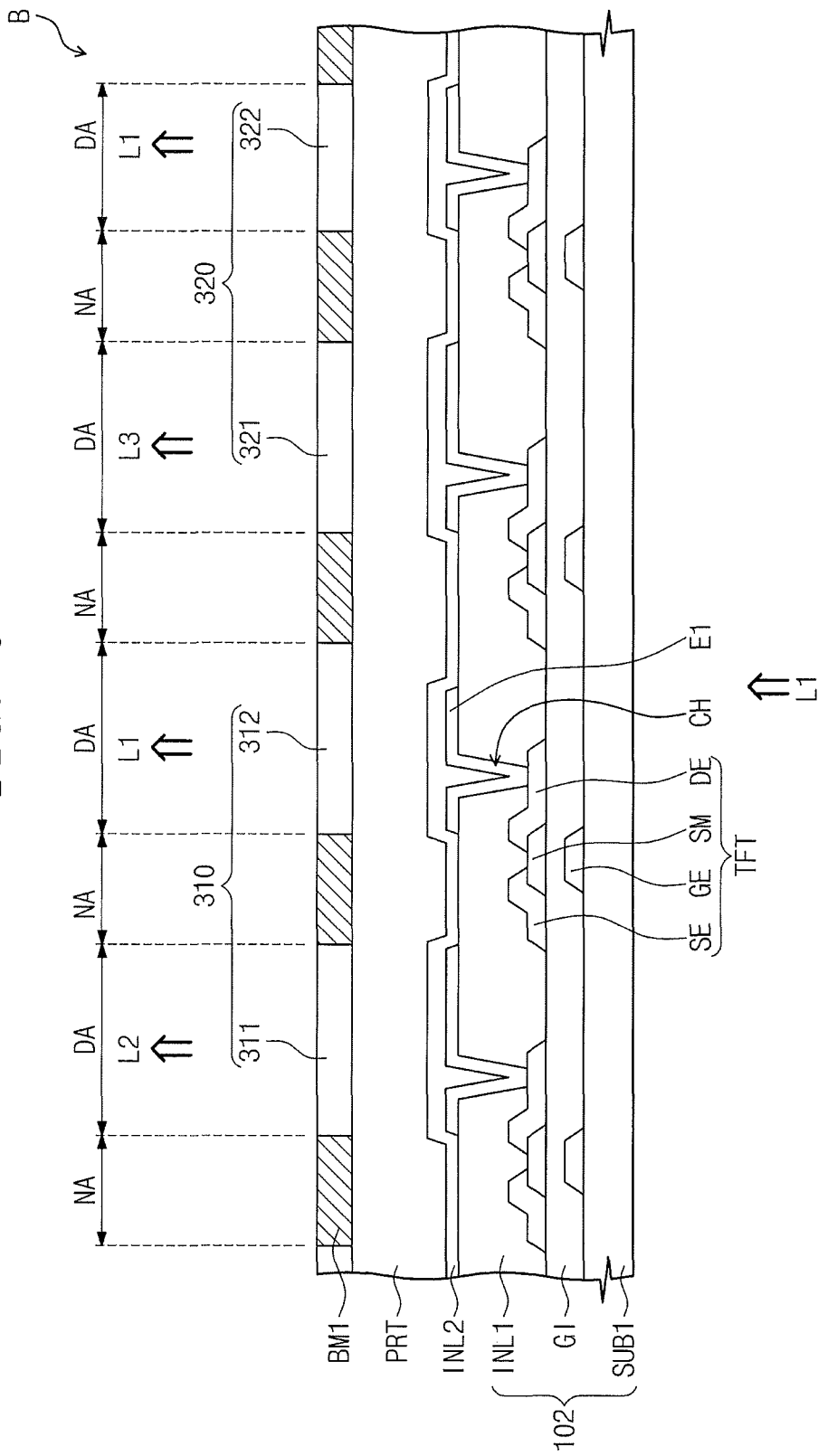
FIG. 6 is a cross-sectional view showing portion "B" in FIG. 5.
Figure 7:
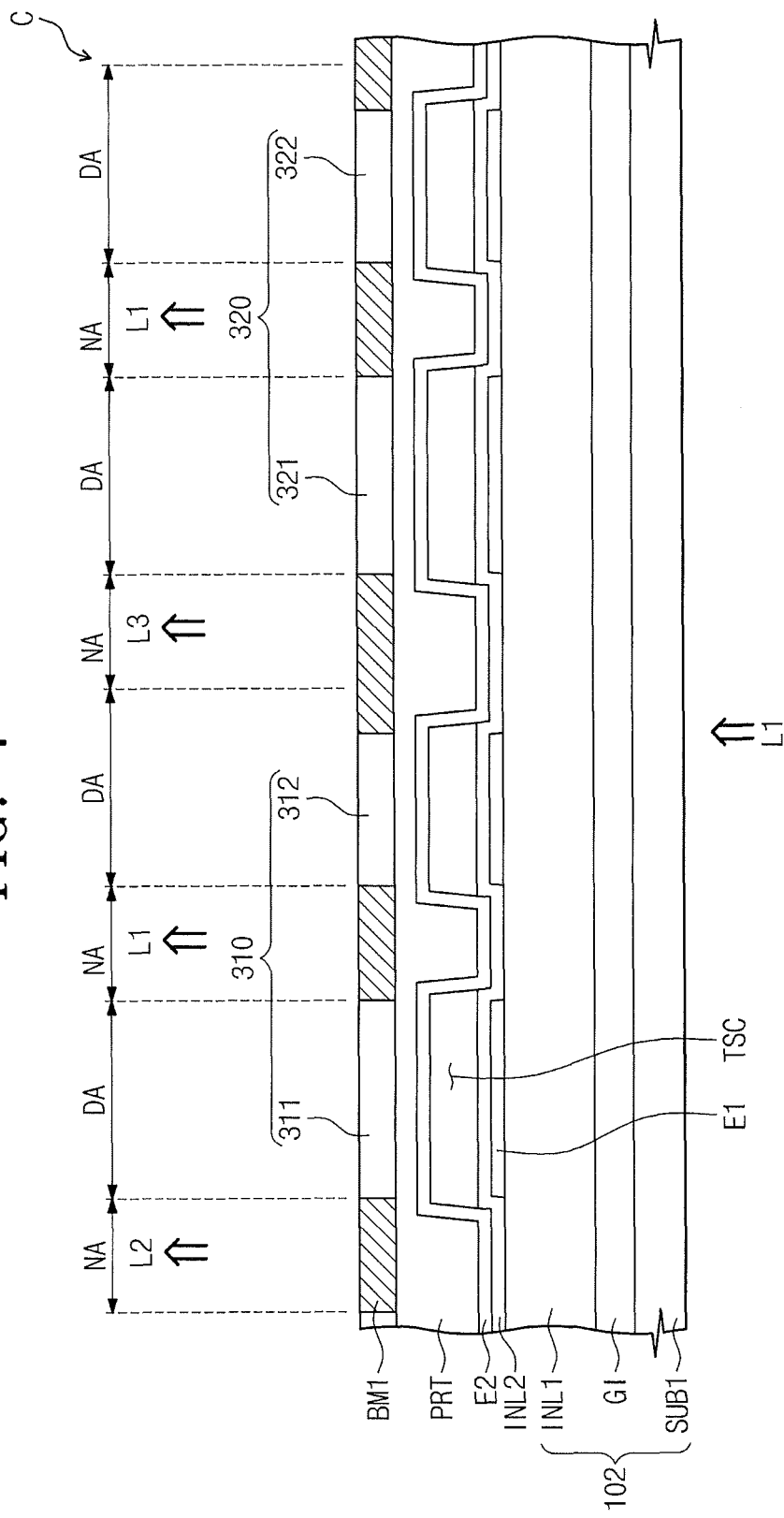
FIG. 7 is a cross-sectional view showing portion "C" in FIG. 5.

FIG. 5 is an exploded perspective view showing another exemplary embodiment of a display device 20 according to the invention, FIG. 6 is a cross-sectional view showing portion "B" in FIG. 5, and FIG. 7 is a cross-sectional view showing portion "C" in FIG. 5. In FIGS. 5 to 7, the same reference numerals denote the same elements in FIGS. 1 and 2, and thus detailed descriptions of the same elements will be omitted.

Referring to FIGS. 5 to 7, the display device 20 includes a display panel 100, a backlight unit 200, a bottom chassis 250, a color conversion layer member 300, a mold frame 400 and a top chassis 500.

The display panel 100 includes a first display substrate otherwise referred to as a first substrate 102.

The display panel 100 includes a plurality of pixels PXL (refer to FIG. 3), each including at least one thin film transistor TFT and a pixel electrode PE to drive liquid crystal molecules. The pixels PXL may be defined by gate lines (not shown) and data lines (not shown), but the invention is not limited thereto or thereby. Referring to FIG. 3, each of the pixels PXL collectively includes a first pixel portion otherwise referred to as a first pixel PXL1 (refer to FIG. 3) and a second pixel portion otherwise referred to as a second pixel PXL2 (refer to FIG. 3). In addition, each of the pixels PXL includes a display area DA (refer to FIG. 3) in which the image is displayed and a non-display area NA (refer to FIG. 3) in which no image is displayed.

The first substrate 102 includes a first base substrate SUB1, the thin film transistor TFT, a first insulating layer INL1, an electrode part, a second insulating layer INL2 and a protective layer PRT.

The first base substrate SUB1 includes a transparent insulating substrate, e.g., a plastic substrate, a glass substrate, a quartz substrate, etc.

The electrode part is disposed on the first base substrate SUB1. The electrode part includes a first electrode E1 and a second electrode E2. The first and second electrodes E1 and E2 are spaced apart from each other and are configured to form an electric field therebetween.

The first electrode E1 controls an image display layer (not shown). In an exemplary embodiment of manufacturing a display device, the first electrode E1 is formed by patterning a conductive layer using a photolithography process. The first electrode E1 includes a transparent conductive material, e.g., ITO, IZO, ITZO, etc., but is not limited thereto or thereby.

The second electrode E2 is disposed to overlap with the first electrode E1 in a plan view. In an exemplary embodiment of manufacturing a display device, the second electrode E2 is formed by patterning a conductive layer using a photolithography process. The second electrode E2 includes a transparent conductive material, e.g., ITO, IZO, ITZO, but is not limited thereto or thereby.

The second insulating layer INL2 is disposed on the first electrode E1. A tunnel-shaped cavity TSC is defined between the first and second electrodes E1 and E2, and the image display layer (not shown) is disposed in the tunnel-shaped cavity TSC.

The image display layer is controlled by the electric field formed between the first and second electrodes E1 and E2, to display the image. The image display layer may be an electrophoretic layer or a liquid crystal layer, but is not limited thereto or thereby, for example, as long as the image display layer is provided in a liquid state.

When the image display layer is the electrophoretic layer, the electrophoretic layer includes an insulating medium and charged particles. The insulating medium corresponds to a dispersive medium in a system in which the charged particles are dispersed. The charged particles represent an electrophoretic property and are dispersed in the insulating medium. The charged particles move in response to the electric field to transmit or block the light passing through the electrophoretic layer, thereby displaying the image.

When the image display layer is the liquid crystal layer, the liquid crystal layer includes liquid crystal molecules having an optical property. The liquid crystal molecules are driven in response to the electric field to transmit or block the light passing through the liquid crystal layer, thereby displaying the image.

The protective layer PRT is disposed on the second insulating layer INL2. The protective layer PRT covers the second insulating layer N2 and seals the tunnel-shaped cavity TSC.

The color conversion layer member 300 receives the first light L1 from the backlight unit 200 and emits at least one of the first light L1, and the second light L2 having the wavelength different from that of the first light L1.

The color conversion layer member 300 is disposed on (e.g., above) or under the display panel 100.

The color conversion layer member 300 collectively includes a plurality of color conversion layers such as a first color conversion layer 310 and a second color conversion layer 320. The first color conversion layer 310 includes a first sub-color conversion layer 311 and a second sub-color conversion layer 312, and the second color conversion layer 320 includes a third sub-color conversion layer 321 and a fourth sub-color conversion layer 322.

Referring to FIGS. 3 and 4 again, the color conversion layer member 300 further includes a black matrix BM1 as described with respect to the display device 10. The black matrix BM1 includes a first black matrix portion BM_1, a second black matrix portion BM_2 and a third black matrix portion BM_3.

When a width in the first direction DR1 of the first black matrix portion BM_1, a width in the first direction DR1 of the second black matrix portion BM_2 and a width in the first direction DR1 of the third black matrix portion BM_3 are respectively referred to as first, second and third widths w1, w2 and w3, the first width w1 is greater than each of the second width w2 and the third width w3. That is, the first width w1 is greater than the second width w2 and greater than the third width w3. The second width w2 may be substantially the same as the third width w3, but the invention is not limited thereto or thereby. That is, the second width w2 may be different from the third width w3.

In general, a conventional display device displays an image using a display panel including pixels each having red, green and blue sub-pixels, and a color conversion layer including red, green and blue sub-color conversion layers respectively corresponding to the red, green and blue sub-pixels. In the conventional display device, a light leakage and a color mixture occur in the display panel, and thus a display quality of the display panel is deteriorated. To prevent the light leakage and the color mixture from occurring, a conventional structure that increases the width of the black matrix has been suggested, but an aperture ratio of the pixels is reduced when the width of the black matrix is increased. As a result, the display quality of the conventional display device is deteriorated and the viewing angle is insufficient.

However, according to one or more exemplary embodiment of the display device 20 of the invention, the red sub-pixel and the green sub-pixels are integrated as a single, discrete (one) sub-pixel and the width of the black matrix between an integrated single, discrete (one) sub-pixel and the blue sub-pixel is increased without decreasing respective widths of the integrated single, discrete (one) sub-pixel and the blue sub-pixel. As a result, the light leakage and the color mixture may be reduced or effectively prevented from occurring without reducing the aperture ratio.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
    a display panel comprising a plurality of pixels arranged in a matrix form along a first direction, and a second direction crossing the first direction, the pixels comprising a first pixel and a second pixel adjacent in the first direction;
    a backlight unit configured to generate and provide a first color light to the display panel; and
    a color conversion layer provided in plural in the first direction and respectively overlapped with the pixels, the color conversion layer configured to receive the first color light which is generated by the backlight unit and emit the first color light and emit a second color light having a wavelength different from a wavelength of the first color light, the color conversion layers comprising a first color conversion layer and a second color conversion layer adjacent in the first direction,
    wherein
    the first pixel comprises a first sub-pixel, and a second sub-pixel spaced apart from the first sub-pixel in the first direction,
    the first color conversion layer comprises:
        a first sub-color conversion layer overlapped with the first sub-pixel, and configured to receive the first color light and emit the second color light; and
        a second sub-color conversion layer overlapped with the second sub-pixel, spaced apart from the first sub-color conversion layer in the first direction, and configured to receive the first color light and emit the first color light,
        wherein the first sub-color conversion layer has an area different from an area of the second sub-color conversion layer in a plan view,
    the second pixel comprises a third sub-pixel, and a fourth sub-pixel spaced apart from the third sub-pixel in the first direction, and
    the second color conversion layer comprises:
        a third sub-color conversion layer overlapped with the third sub-pixel, and configured to receive the first color light and emit a third color light having a wavelength different from the first and second color lights, and
        a fourth sub-color conversion layer overlapped with the fourth sub-pixel, spaced apart from the third sub-color conversion layer in the first direction, and configured to receive the first color light and emit the first color light,
        wherein
        the third sub-color conversion layer has an area different from an area of the fourth sub-color conversion layer in the plan view, and
        the first sub-color conversion layer, the second sub-color conversion layer, the third sub-color conversion layer and the fourth sub-color conversion layer are arranged sequentially the first direction.

2. The display device of claim 1, wherein each of the color conversion layer, the first sub-color conversion layer and the second sub-color conversion layer has a quadrangular shape.

3. The display device of claim 2, wherein, in the plan view,
    a first side of the first sub-color conversion layer and a first side of the second sub-color conversion layer are collinear, and
    a second side of the first sub-color conversion layer, which is substantially parallel to the first side of the first sub-color conversion layer, and a second side of the second sub-color conversion layer, which is substantially parallel to the first side of the second sub-color conversion layer, are collinear.

4. The display device of claim 3, wherein the color conversion layer further comprises a black matrix, and the black matrix surrounds the first and second sub-color conversion layers in the plan view.

5. The display device of claim 4, wherein the pixel further comprises a display area in which an image is displayed and a non-display area in which no image is displayed.

6. The display device of claim 5, wherein
    the first and second sub-color conversion layers are overlapped with the display area, and
    the black matrix is overlapped with the non-display area.

7. The display device of claim 6, wherein the black matrix comprises:
    a first black matrix portion between the first sub-color conversion layer and the second sub-color conversion layer;
    a second black matrix portion spaced apart from the first black matrix portion and contacting the first sub-color conversion layer; and
    a third black matrix portion spaced apart from the first black matrix portion and contacting the second sub-color conversion layer.

8. The display device of claim 7, wherein, when widths in the first direction of the first black matrix portion, the second black matrix portion and the third black matrix portion are respectively referred to as first, second and third widths, the first width is greater than each of the second and third widths.

9. The display device of claim 8, wherein the first width is equal to a sum of the second width and the third width.

10. The display device of claim 2, wherein, when a width in the first direction of the first sub-color conversion layer is referred to as a first sub-width and a width in the first direction of the second sub-color conversion layer is referred to as a second sub-width, the first sub-width is greater than the second sub-width.

11. The display device of claim 1, wherein the first color light is a blue light.

12. The display device of claim 1, wherein the second color light is a red light or a green light.

13. The display device of claim 1, wherein the area of the first sub-color conversion layer is equal to the area of the third sub-color conversion layer in the plan view.

14. The display device of claim 1, wherein each of the first and second color conversion layers is provided in a plural number, and the first color conversion layers and the second color conversion layers are alternately arranged with each other in the first and second directions.

15. The display device of claim 1, wherein
    the color conversion layer is disposed outside the display panel, and
    the display panel comprises:
        a first display substrate;
        a second display substrate facing the first display substrate; and
        a liquid crystal layer between the first display substrate and the second display substrate.

16. The display device of claim 1, wherein
the color conversion layer is disposed outside the display panel, and
the display panel comprises:
   a first display substrate comprising:
      a first base substrate;
      an electrode part comprising a first electrode and a second electrode on the first base substrate, insulated from each other and configured to form an electric field therebetween;
      an insulating layer which is on the electrode part and defines a tunnel-shaped cavity between the first and second electrodes; and
      a protecting layer which covers the insulating layer and seals the tunnel-shape cavity.

17. The display device of claim 1, wherein the color conversion layer is disposed outside of the display panel, and above or below the display panel.

\* \* \* \* \*